US008855629B2

(12) United States Patent
Liu (10) Patent No.: US 8,855,629 B2
(45) Date of Patent: Oct. 7, 2014

(54) SYNCHRONIZATION OF MOBILITY MANAGEMENT DATA BETWEEN A CIRCUIT-SWITCHED DOMAIN AND A PACKET-SWITCHED DOMAIN (71) Applicant: Jennifer Liu, Plano, TX (US)

(72) Inventor: Jennifer Liu, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/729,967

(22) Filed: Dec. 28, 2012

(65) Prior Publication Data

US 2013/0196656 A1 Aug. 1, 2013

Related U.S. Application Data (60) Provisional application No. 61/591,007, filed on Jan. 26, 2012.

(51) Int. Cl.
*H04W 8/06* (2009.01)
*H04W 8/12* (2009.01)
(52) U.S. Cl.
CPC .. *H04W 8/06* (2013.01); *H04W 8/12* (2013.01)
USPC .......................... 455/433; 370/331; 455/422.1
(58) Field of Classification Search
CPC ......... H04W 8/04; H04W 4/02; H04W 48/18; H04W 36/18; H04B 2201/70701; H04B 7/2628
USPC ................. 455/433, 422.1; 370/331, 335, 342
See application file for complete search history.

(56) References Cited

U.S. PATENT DOCUMENTS

| | | | |
|---|---|---|---|
| 7,782,818 B2* | 8/2010 | Hurtta et al. | 370/331 |
| 2009/0111458 A1* | 4/2009 | Fox et al. | 455/422.1 |
| 2011/0013623 A1 | 1/2011 | Hu et al. | |
| 2011/0117931 A1 | 5/2011 | Hu et al. | |

OTHER PUBLICATIONS

Alcatel Lucent: "Discussion on SGx and Gs association status synchronization in the EPS and GPRS network", 3GPP Draft; C1-120194 DISC_GS_SGS_SYNC, 3rd Generation Partnership Project (3GPP), Mobile Competence Centre; 650, Route Des Lucioles; F-06921 Sophia-Antipolis Cedex; France, vol. CTWG1, No. Xiamen (P.R.China); 20120206-20120210, Jan. 30, 2012, XP050556503, [retrieved on Jan. 30, 2012].

(Continued)

*Primary Examiner* — Phuoc H Doan
(74) *Attorney, Agent, or Firm* — Duft Bornsen & Fettig, LLP (57) ABSTRACT Systems and methods for synchronizing mobility management (MM) data between a CS domain and a PS domain. In one embodiment, a visitor location database of the CS domain stores MM data for a mobile device. If the visitor location database updates MM data for the mobile device to add an association for an MM node for mobility management, then the visitor location database determines if a prior association existed with another MM node. If so, the visitor location database removes the prior association with the other MM node, and transmits a release indicator to the other MM node indicating that the association has been removed. In response to the release indicator, the other MM node removes an association with the visitor location database, and the MM data for the mobile device is synchronized between the CS domain and the PS domain.

20 Claims, 7 Drawing Sheets

(56) References Cited

OTHER PUBLICATIONS

SA WG2: "[Draft] Reply LS on ISR de-activation in S4-SGSN during MS initiated PDP context de-activation", 3GPP Draft; S2-113944, 3rd Generation Partnership Project (3GPP), Mobile Competence Centre; 650, Route Des Lucioles; F-06921 Sophia-Antipolis Cedex; France, vol. SA WG2, No. Jeju Island); 20111010, Sep. 30, 2011, XP050549134 [retrieved on Sep. 30, 2011].

SA2 "[Draft] Reply LS on ISR de-activation in S4-SGSN during MS initiated PDP context de-activation", 3GPP Draft; S2-114707_REV_S2-114491, LS on ISR Deactivation, 3rd Generation Partnership Project (3GPP), Mobile Competence Centre; 650, Route Des Lucioles; F-06921 Sophia-Antipolis Cedex; France, vol. SA WG2, No. Jeju Island); 20111010, Oct. 21, 2011, XP050549828 [retrieved on Oct. 21, 2011].

* cited by examiner

SYNCHRONIZATION OF MOBILITY MANAGEMENT DATA BETWEEN A CIRCUIT-SWITCHED DOMAIN AND A PACKET-SWITCHED DOMAIN

FIELD OF THE INVENTION

The invention is related to the field of communications and, in particular, to synchronizing data between a Circuit Switched (CS) domain and a Packet-Switched (PS) domain.

BACKGROUND

Service providers typically offer numerous voice and data services to end users. Some examples of voice services are voice calls, call forwarding, call waiting, etc. Some examples of data services are Internet access, streaming audio, streaming video, online gaming, IP-TV, etc.

The first types of wireless or mobile networks that were introduced by services providers were First Generation (1G) and Second Generation (2G) networks. 1G networks provided voice services via analog signals, and then evolved into 2G networks that provided voice services via digital signals. Mobile communications then evolved into 3G (including 2.5G) networks that provided both voice services and data services. For example, 3G networks are able to provide wireless voice telephony, as well as data services such as Internet access, video calls, mobile TV, etc. Some of the 3G networks implemented by service providers were Universal Mobile Telecommunications System (UMTS) networks, EV-DO networks, General Packet Radio Service (GPRS) networks, etc. Service providers are now beginning to migrate their networks toward Fourth Generation (4G) technologies. 4G networks are essentially enhancements to 3G networks in terms of data speeds. For example, a 3G network can provide data speeds of about 3.5 Mbit/sec. According to the International Telecommunication Union (ITU), a 4G network can provide data speeds of 100 Mbit/sec. One example of a 4G network is a Long Term Evolution (LTE) network.

Presently, 4G communications are available in limited areas, such as large cities. When a mobile device is in the coverage area of a 4G network, the mobile device is able to attach to the 4G network to receive services. When a 4G network is not available, the mobile device may be in the coverage area of a 3G (or 2G) network in many cases. Thus, the mobile device can register with the 3G network to receive services. Mobile devices that are able to register with both 4G and 3G networks may be referred to as dual mode or multi-mode devices.

Early implementations of 4G networks provide data services but do not provide voice services for mobile devices (assuming VoIP services are not available through the IP Multimedia Subsystem (IMS)). Therefore, in order for the mobile device to place or receive voice calls, the mobile device needs to also attach to a Circuit-Switched (CS) core network (2G or 3G) to access voice services. The CS core network that provides voice services is referred to as the CS domain, while the data portion of a 3G or 4G network that provides data services is referred to as the Packet-Switched (PS) domain. When a mobile device switches from a 4G network to a CS core network to originate or terminate voice calls, this is referred to as "CS Fallback".

In order to serve a mobile device, the CS domain and the PS domain perform mobility management procedures such as attach, paging, and location update procedures. The attach procedure is a process that a mobile device performs to register with a network before the mobile device can access services. The paging procedure is a process where the network contacts the mobile device using control messages. Location update is a procedure where the location of a mobile device is reported to the network.

Both the CS domain and the PS domain store a Mobility Management (MM) context for a mobile device, which indicates the mobility information for the device. For example, the MM context for a mobile device may include an International Mobile Subscriber Identity (IMSI), a MM state, a Temporary Mobile Subscriber Identity (TMSI or P-TMSI), a location area or routing area, a Mobile Station ISDN Number (MSISDN), ciphering algorithms, etc. Most networks allow a mobile device to simultaneously connect to the CS domain and the PS domain, which is sometimes referred to as a Class A operation mode or PS/CS operation mode. When a mobile device is allowed to simultaneously attach to the CS domain and the PS domain, MM data can become desynchronized across the CS and PS domains. If MM data is not synchronized, mobility management procedures may not be performed correctly. For example, paging procedures to the mobile device may not be performed correctly if the MM data is not synchronized between the CS and PS domains.

SUMMARY

Embodiments described herein synchronize Mobility Management (MM) data between the CS domain and the PS domain through a visitor location database implemented in the CS domain. Before discussing how the visitor location database synchronizes the MM data, the following briefly summarizes how MM data can become desynchronized. The visitor location database is a node in the CS domain that maintains MM data for a mobile device. The visitor location database interacts with the PS domain to track the location of the mobile device if the mobile device attaches to a PS data network. If the mobile device attaches to a PS data network, then a Mobility Management (MM) node in the PS data network sends a location update to the visitor location database to establish a signaling connection with the CS domain. A MM node comprises any network node in the PS domain that tracks the location of a mobile device. When the visitor location database receives a location update from a MM node in the PS domain, it updates the MM data for the mobile device to activate an "association" with the MM node for the purpose of mobility management. For example, the visitor location database may add an identifier (ID) for the MM node into a location register for the mobile device. If a prior association existed with another MM node from the PS domain, then the visitor location database deactivates the prior association with the other MM node from the location register of the mobile device. Even though the visitor location database has deactivated the prior association with the other MM node, that MM node is not aware of the signaling connection changes at the visitor location database and continues to store MM data for the mobile device indicating an association with the visitor location database. When this occurs, the MM data for the mobile device is no longer synchronized between the CS domain (i.e., the visitor location database) and the PS domain (i.e., the other MM node).

In the embodiments described herein, the visitor location database notifies the other MM node that the association with the other MM node has been deactivated in the location register of the mobile device. Therefore, the other MM node can update its local MM data for the mobile device to indicate that its association with the visitor location database is likewise deactivated. When this MM node updates the MM data for the mobile device in response to the notification from the visitor location database, the MM data for the mobile device is advantageously synchronized between the CS domain and the PS domain. Mobility management procedures for the mobile device will therefore be performed correctly.

One embodiment comprises a visitor location database of a CS domain. The visitor location database is configured to communicate with a first MM node of a first PS data network that connects to the mobile device in the PS domain. The visitor location database is configured to store MM data for the mobile device that indicates an association with the first MM node. If the mobile device moves from the first PS data network to a second PS data network, then the visitor location database is further configured to update the MM data for the mobile device to remove the association with the first MM node. The visitor location database is further configured to generate a release indicator which indicates that the association with the first MM node has been removed, and to transmit the release indicator to the first MM node so that the first MM node releases an association with the visitor location database from the MM data stored for the mobile device.

In another embodiment, the visitor location database is further configured to update the MM data for the mobile device to add an association with a second MM node of the second PS data network in response to the mobile device moving from the first PS data network to the second PS data network.

In another embodiment, the first MM node comprises a Serving GPRS Support Node (SGSN) of a General Packet Radio Service (GPRS) network, and the SGSN connects to the visitor location database over a Gs interface. The visited location database is further configured to insert the release indicator in a new Information Element (IE) of a message defined for the Gs interface.

In another embodiment, the message defined for the Gs interface comprises a Gs-RELEASE-REQUEST.

In another embodiment, the first MM node comprises a Mobility Management Entity (MME) of a Long Term Evolution (LTE) network, and the MME connects to the visitor location database over an SGs interface. The visited location database is further configured to insert the release indicator in a new Information Element (IE) of a message defined for the SGs interface.

In another embodiment, the message defined for the SGs interface comprises an SGs-RELEASE-REQUEST.

In another embodiment, the visitor location database comprises a Visitor Location Register (VLR) of the CS domain.

Another embodiment comprises a method operable in a visitor location database of a CS domain. The visitor location database is configured to communicate with a first MM node of a first PS data network that connects to the mobile device in a PS domain, and to communicate with a second MM node of a second PS data network that connects to the mobile device in the PS domain. The method includes storing MM data for the mobile device that indicates an association with the first MM node. If the mobile device moves from the first PS data network to the second PS data network, then the method further includes updating the MM data for the mobile device to remove the association with the first MM node, generating a release indicator which indicates that the association with the first MM node has been removed, and transmitting the release indicator to the first MM node so that the first MM node releases an association with the visitor location database from the MM data stored for the mobile device.

In another embodiment, the method further includes updating the MM data for the mobile device to add an association with a second MM node of the second PS data network in response to the mobile device moving from the first PS data network to the second PS data network.

In another embodiment, the first MM node comprises a Serving GPRS Support Node (SGSN) of a General Packet Radio Service (GPRS) network, and the SGSN connects to the visitor location database over a Gs interface. The method further includes inserting the release indicator in a new Information Element (IE) of a message defined for the Gs interface.

In another embodiment, the message defined for the Gs interface comprises a Gs-RELEASE-REQUEST.

In another embodiment, the first MM node comprises a Mobility Management Entity (MME) of a Long Term Evolution (LTE) network, and the MME connects to the visitor location database over an SGs interface. The method further includes inserting the release indicator in a new Information Element (IE) of a message defined for the SGs interface.

In another embodiment, the message defined for the SGs interface comprises an SGs-RELEASE-REQUEST.

In another embodiment, the visitor location database comprises a Visitor Location Register (VLR) of the CS domain.

Another embodiment comprises a Visitor Location Register (VLR) of a Circuit-Switched (CS) domain that is able to provide voice communications to a mobile device. The VLR is configured to communicate with a Serving GPRS Support Node (SGSN) of a General Packet Radio Service (GPRS) network over a Gs interface, and to communicate with a Mobility Management Entity (MME) of a Long Term Evolution (LTE) network over an SGs interface. If the mobile device attaches to the GPRS network after initially attaching to the LTE network, then the VLR is further configured to update MM data for the mobile device to activate a Gs association with the SGSN, and to update the MM data for the mobile device to deactivate an SGs association with the MME. The VLR is further configured to generate a release indicator which indicates that the SGs association is deactivated in the VLR, and to transmit the release indicator to the MME over the SGs interface.

In another embodiment, the VLR is further configured to insert the release indicator in a new Information Element (IE) of a message defined for the SGs interface.

In another embodiment, the message defined for the SGs interface comprises an SGs-RELEASE-REQUEST.

In another embodiment, if the mobile device attaches to the LTE network after initially attaching to the GPRS network, then the VLR is further configured to update MM data for the mobile device to activate an SGs association with the MME, and to update the MM data for the mobile device to deactivate a Gs association with the SGSN. The VLR is further configured to generate a release indicator which indicates that the Gs association is deactivated in the VLR, and to transmit the release indicator to the SGSN over the Gs interface.

In another embodiment, the VLR is further configured to insert the release indicator in a new Information Element (IE) of a message defined for the Gs interface.

In another embodiment, the message defined for the Gs interface comprises a Gs-RELEASE-REQUEST.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
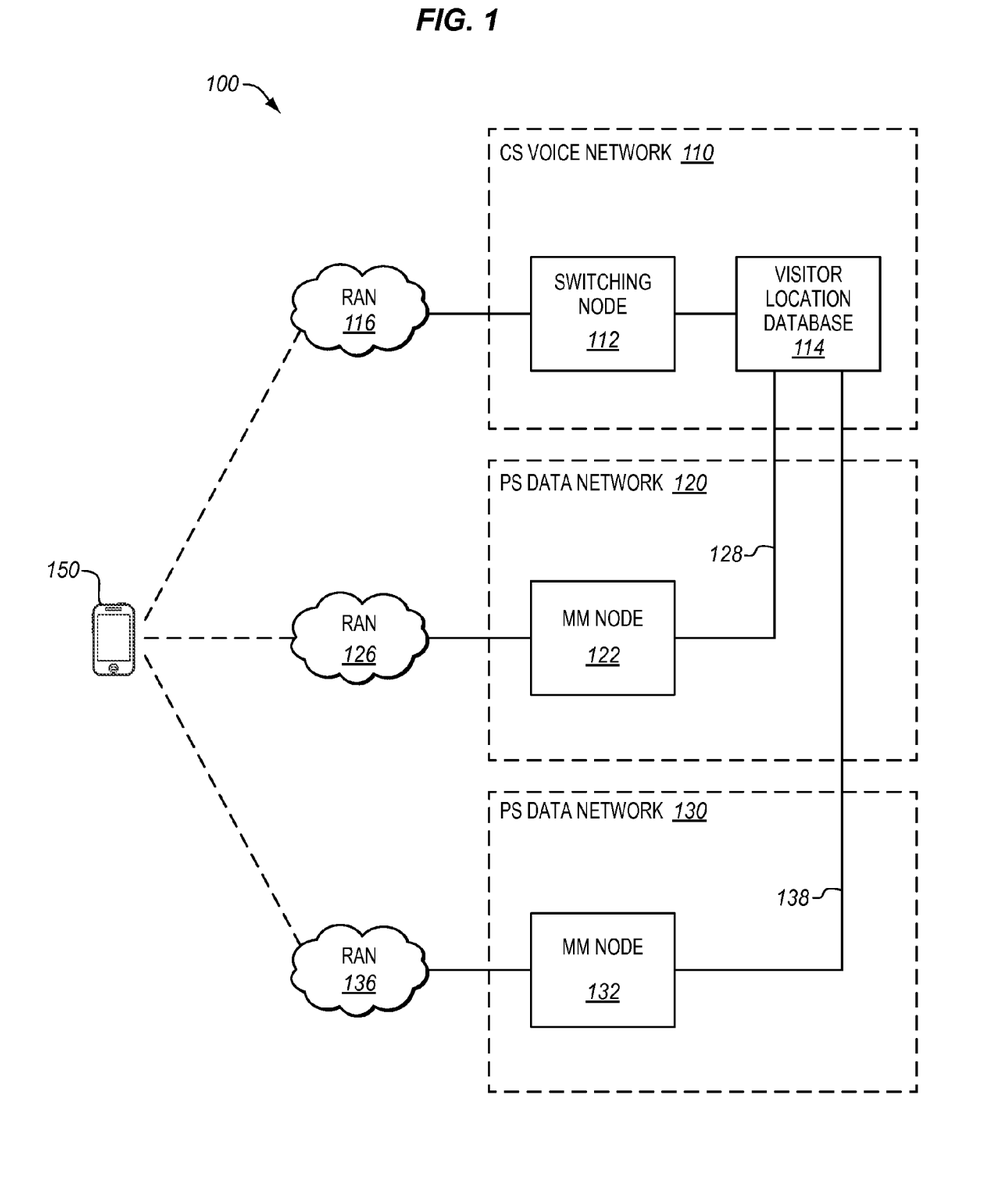
FIG. 1 illustrates a network architecture in an exemplary embodiment.

FIG. 1 illustrates a network architecture 100 in an exemplary embodiment. Network architecture 100 includes a plurality of networks that are able to provide services to a mobile device 150 (also referred to as User Equipment (UE)). The first network shown is Circuit-Switched (CS) voice network 110 that is configured to provide traditional voice services to mobile device 150 through Radio Access Network (RAN) 116. CS voice network 110 may also be referred to herein as the CS domain. Some examples of CS voice network 110 may be a GSM network, a CDMA2000 network, etc. In this embodiment, CS voice network 110 includes a switching node 112 (such as a Mobile Switching Center (MSC)), and a visitor location database 114. Visitor location database 114 comprises any network node that stores information, such as a location register, regarding subscribers that are located in an area served by switching node 112. One example of visitor location database 114 is a Visitor Location Register (VLR). Although switching node 112 and visitor location database 114 are shown as separate elements, visitor location database 114 may be integrated within switching node 112. CS voice network 110 may also include other network nodes that are not shown in FIG. 1, such as a Home Location Register (HLR).

The second network shown in FIG. 1 is a Packet-Switched (PS) data network 120, which is configured to provide data services to mobile device 150 through RAN 126. PS data network 120 may be referred herein as the PS domain. Some examples of PS data network 120 may be a GPRS network, a UMTS network, etc. PS data network 120 includes a Mobility Management (MM) node 122, which comprises any network node in the PS domain that tracks the location of mobile device 150 so that services may be provided to mobile device 150. One example of MM node 122 is a Serving GPRS Support Node (SGSN) of a GPRS network. PS data network 120 may include other network nodes that are not shown in FIG. 1.

The third network shown in FIG. 1 is another PS data network 130 that is also part of the PS domain, and is configured to provide data services to mobile device 150 through RAN 136. The assumption herein is that PS data network 120 and PS data network 130 are different technology networks that are available to mobile device 150. For example, PS data network 120 may represent a 2.5G or 3G data network that a service provider has implemented to offer data services to its subscribers, such as a GPRS network. As the service provider migrates its network architecture to include 4G technologies, then PS data network 130 may represent the 4G portion of the network architecture that is overlaid on the 3G data network. For example, PS data network 130 may be a Long Term Evolution (LTE) network. In this embodiment, PS data network 130 also includes a Mobility Management (MM) node 132. One example of MM node 132 is a Mobility Management Entity (MME) of an LTE network. PS data network 130 may include other network nodes that are not shown in FIG. 1.

Although PS data networks 120 and 130 are able to provide data services to mobile device 150, the assumption herein is that they do not provide voice services to mobile device 150. The voice services for mobile device 150 are handled by CS voice network 110. Anytime a voice call is received for mobile device 150, PS data networks 120 and 130 "fallback" to CS voice network 110 to complete the call. In order to allow for fallback to CS voice network 110, the CS domain needs to know where mobile device 150 is located in the network. Thus, PS data networks 120 and 130 exchange mobility management (MM) data with the CS domain so that the location of mobile device 150 is known. To exchange MM data, MM node 122 communicates with visitor location database 114 over interface 128, while MM node 132 communicates with visitor location database 114 over interface 138. If MM node 122 represents an SGSN of a GPRS network, then interface 128 may comprise a Gs interface. If MM node 132 represents an MME of an LTE network, then interface 138 may comprise an SGs interface.

Visitor location database 114 stores MM data for mobile device 150, such as in a location register for mobile device 150. The MM data may also be referred to as an MM context. One particular piece of information stored for an MM context of a mobile device is an identifier (ID) or some other information for an MM node in the PS domain that is connected to mobile device 150. For example, if mobile device 150 attaches to PS data network 120, then MM node 122 will be "connected" to mobile device 150 for mobility management. Thus, visitor location database 114 will store an ID for MM node 122 so that it knows which node to contact for mobility management. When visitor location database 114 stores an ID for an MM node in this manner, it is referred to as an "association". An association is considered a relationship or path between an entity of the CS domain and an entity of the PS domain for mobility management. For example, if MM node 122 comprises an SGSN of a GPRS network, then visitor location database 114 will store an "SGSN association" or a "Gs association", which indicates the SGSN that is providing mobility management for mobile device 150 over a Gs interface.

At the same time that visitor location database 114 stores an MM context for mobile device 150, MM nodes 122 and 132 may also store an MM context for mobile device 150 in location register. One particular piece of information stored for an MM context in an MM node is an ID or some other information for the visitor location database in the CS domain. Thus, MM node 122, for example, will store an ID for visitor location database 114 so that it knows which node in the CS domain to contact for mobility management. When MM node 122 stores an ID for visitor location database 114 in this manner, it is also referred to as an "association". For example, if visitor location database 114 comprises a VLR, then MM node 122 will store a VLR association which indicates the VLR that is providing mobility management for mobile device 150 in the CS domain.

With MM data being stored both in the CS domain and the PS domain, it is important to make sure that the MM data is synchronized between the domains. However, there are scenarios where the MM data can become desynchronized between the domains, as is described in FIG. 2.

Figure 2:
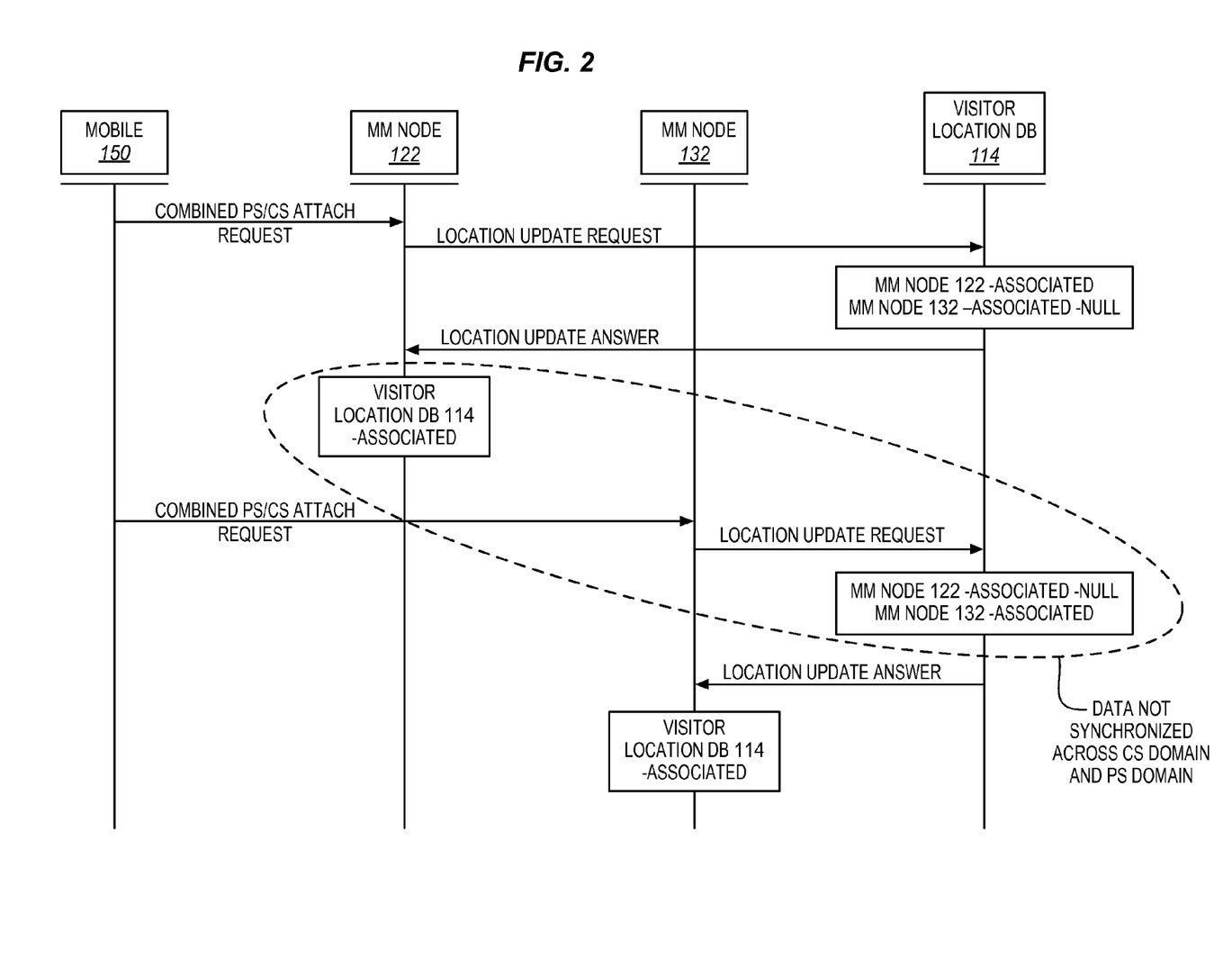
FIG. 2 is a message diagram illustrating Mobility Management (MM) data becoming desynchronized between a CS domain and a PS domain in an exemplary embodiment.

FIG. 2 is a message diagram illustrating MM data becoming desynchronized in an exemplary embodiment. Assume for example that mobile device 150 sends a combined PS/CS attach request (or update request) to MM node 122. In response to the combined PS/CS attach request, MM node 122 sends a location update request to visitor location database 114 with the location area or routing area where mobile device 150 is located. In response to the location update, visitor location database 114 adds or activates an association for MM node 122 in the MM context for mobile device 150, such as by storing an ID for MM node 122 in a location register for mobile device 150. MM node 122 is therefore "associated" with visitor location database 114 for mobile device 150 (MM node 132 is "associated—NULL"). Visitor location database 114 then responds back to MM node 122 with a location update answer. MM node 122 adds or activates an association for visitor location database 114 in the MM context for mobile device 150, such as by storing an ID for visitor location database 114 in a location register for mobile device 150. Visitor location database 114 is therefore "associated" with MM node 122 for mobile device 150.

Assume further that mobile device 150 moves from the service area of PS data network 120 to the service area of PS data network 130. When this occurs, mobile device 150 will send combined a PS/CS attach request to MM node 132 of PS data network 130. Mobile device 150 cannot be simultaneously attached to both PS data networks, so mobile device 150 will also detach from PS data network 120 (which is not shown in FIG. 2). When MM node 132 receives the combined PS/CS attach request, it sends a location update request to visitor location database 114 with the location area or routing area where mobile device 150 is located. In response to the location update, visitor location database 114 adds or activates an association for MM node 132 in the MM context for mobile device 150. In the CS domain, activation of one association will trigger deactivation of another association. Thus, visitor location database 114 will remove the prior association with MM node 122 from the location register of mobile device 150. MM node 132 is now indicated in visitor location database 114 as "associated" for mobile device 150 (MM node 122 is "associated—NULL"). Visitor location database 114 then responds back to MM node 132 with a location update answer. MM node 132 adds an association for visitor location database 114 in the MM context for mobile device 150, such as by storing an ID for visitor location database 114. Visitor location database 114 is therefore associated with MM node 132 for mobile device 150.

After mobile device 150 attaches to PS data network 130, the MM data in the CS domain is no longer synchronized with the PS domain. Visitor location database 114 indicates an association with MM node 132, and MM node 132 indicates an association with visitor location database 114. However, MM node 122 also indicates an association with visitor location database 114, but visitor location database 114 no longer has an association with MM node 122. After mobile device 150 moves from PS data network 120 and attaches to PS data network 130, there is no longer an association between MM node 122 and visitor location database 114. Thus, MM node 122 is storing incorrect MM data for mobile device 150, and the MM data for mobile device 150 is no longer synchronized between the CS domain and the PS domain.

In the embodiments described herein, visitor location database 114 of CS voice network 110 is enhanced to synchronize MM data between the CS domain and PS domain. An exemplary operation of visitor location database 114 for synchronizing MM data is described in FIG. 3.

Figure 3:
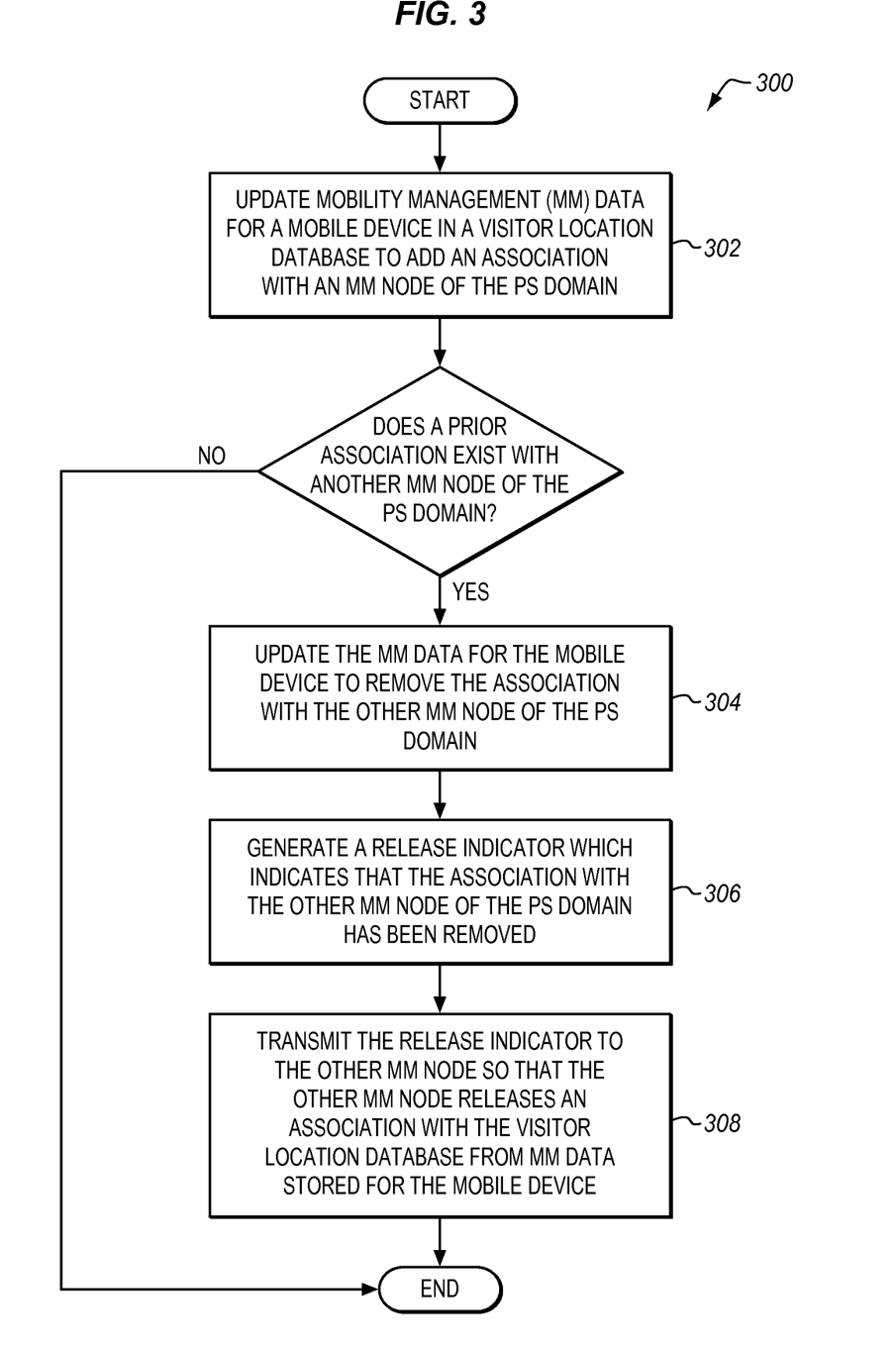
FIG. 3 is a flow chart illustrating a method of synchronizing MM data in an exemplary embodiment.

FIG. 3 is a flow chart illustrating a method 300 of synchronizing MM data in an exemplary embodiment. The steps of method 300 will be described with reference to visitor location database 114 in FIG. 1, but those skilled in the art will appreciate that method 300 may be performed in other nodes. The steps of the flow charts described herein are not all inclusive and may include other steps not shown. The steps may also be performed in an alternative order.

Assume again that mobile device 150 was attached to PS data network 120 and moves to PS data network 130 as shown in FIG. 2. MM node 132 receives the combined PS/CS attach request from mobile device 150, and sends a location update request to visitor location database 114. Visitor location database 114 receives the location update request from MM node 132 indicating that mobile device 150 is connected (or has attached) to the MM node 132. In response to the location update request, visitor location database 114 updates the MM data in the location register for mobile device 150. To do so, visitor location database 114 adds or activates an association with MM node 132 that is presently connected to mobile device 150 (see step 302 in FIG. 3). For example, visitor location database 114 may add or store an ID for MM node 132 in the location register for mobile device 150 to indicate that mobile device 150 is connected to MM node 132 of the PS domain. Visitor location database 114 also determines if a prior association exists with another MM node in step 304. For example, visitor location database 114 may search the location register for mobile device 150 to see if an ID for another MM node has been stored. If so, visitor location database 114 updates the MM data for mobile device 150 to remove or deactivate the prior association with the other MM node in step 306. For example, visitor location database 114 may remove or delete an ID for MM node 122 in the location register for mobile device 150 to indicate that mobile device 150 is no longer connected to mobile device 150. Thus, the MM data stored in visitor location database 114 will indicate an association with MM node 132 and no association with MM node 122.

If visitor location database 114 removes a prior association with another MM node from the location register of mobile device 150, then visitor location database 114 will notify the other MM node according to method 300. To do so, visitor location database 114 generates a release indicator which indicates that the prior association with the other MM node has been removed from the location register for mobile device 150 (see step 308). The release indicator comprises any data, field, or parameter that notifies or informs an MM node when an association has been removed from visitor location database 114. The release indicator may additionally or alternatively include a command or instruction for the MM node to remove a corresponding association from the MM data that it stores locally for mobile device 150. The indicator is referred to as a "release" indicator because the MM node is requested to release its association with visitor location database 114 due to the changes made in the location register of visitor location database 114.

Visitor location database 114 then transmits the release indicator to the MM node in step 310, which is MM node 122. Visitor location database 114 may insert the release indicator into an existing message defined for the interface used by MM node 122. For example, if the interface between visitor location database 114 and MM node 122 is a Gs interface, then visitor location database 114 may insert the release indicator into a Gs-RELEASE-REQUEST. A new Information Element (IE) may be defined in the Gs interface for the release indicator. If the interface between visitor location database 114 and MM node 122 is an SGs interface, then visitor location database 114 may insert the release indicator into an SGs-RELEASE-REQUEST. A new IE may be defined in the SGs interface for the release indicator. Visitor location database 114 may also define a new message for the release indicator.

In response to receiving the release indicator, MM node 122 releases the association with visitor location database 114 from the MM data stored for mobile device 150. For example, visitor location database 114 may remove the ID for visitor location database 114 from the MM data stored for mobile device 150. After MM node 122 removes the association with visitor location database 114, the MM data for mobile device 150 is synchronized between the CS domain and the PS domain.

Figure 4:
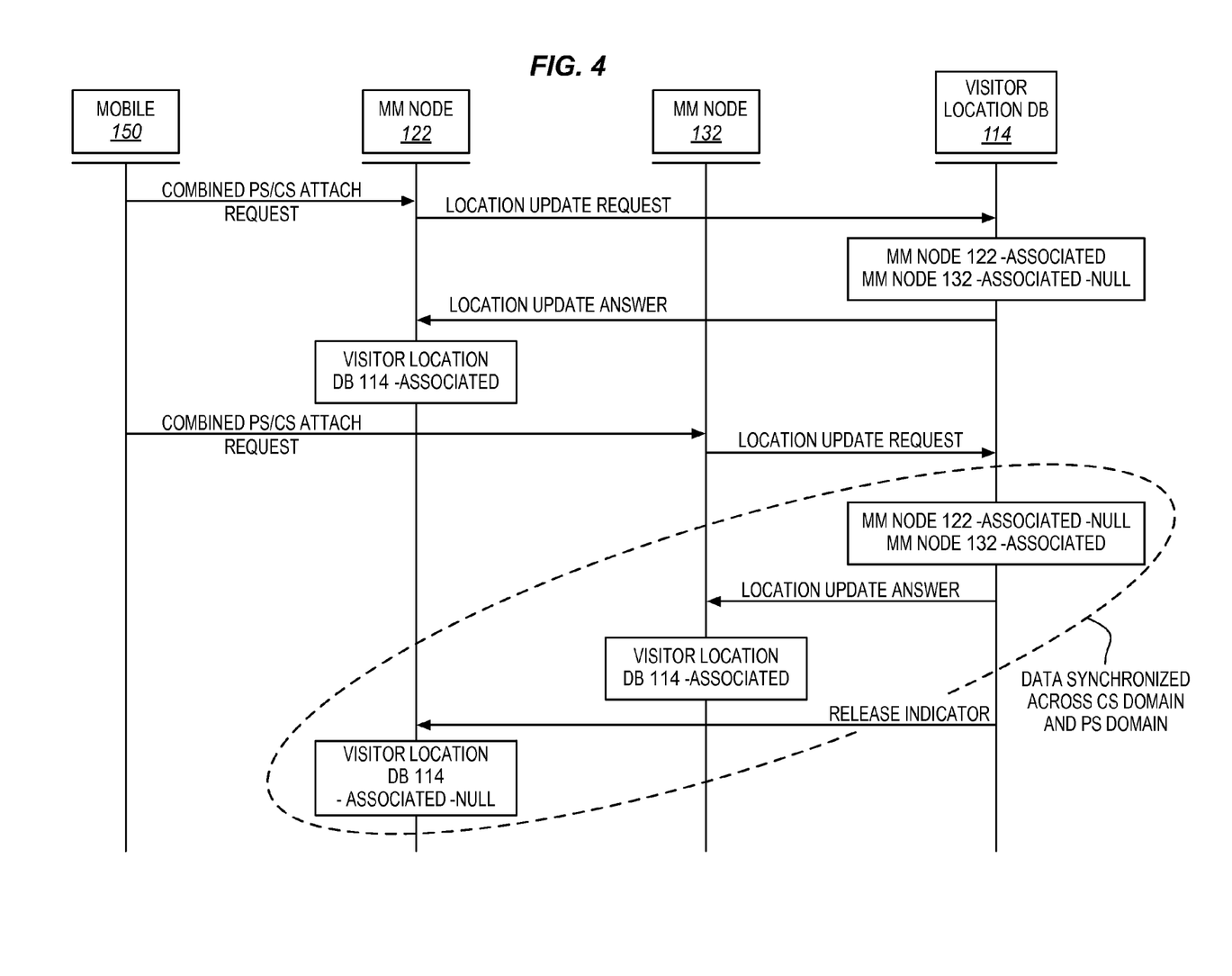
FIG. 4 is a message diagram illustrating MM data becoming synchronized in an exemplary embodiment.

FIG. 4 is a message diagram illustrating MM data becoming synchronized in an exemplary embodiment. FIG. 4 is similar to FIG. 2, except than when visitor location database 114 removes the prior association with MM node 122 from the location register of mobile device 150, visitor location database 114 sends the release indicator to MM node 122. In response to receiving the release indicator, MM node 122 releases the association with visitor location database 114 from the MM data stored for mobile device 150. Therefore, the MM data for mobile device 150 is now synchronized between the CS domain and the PS domain.

To summarize method 300, when visitor location database 114 updates the MM context for mobile device 150 to remove an association with an MM node, visitor location database 114 notifies this MM node of the disassociation using a release indicator. The MM node can then remove its association with visitor location database 114 so that the MM data for mobile device 150 is synchronized between the CS domain and the PS domain. Previously, the MM node would maintain its association with visitor location database 114 even though mobile device 150 attached to another network. This can be problematic to mobility management procedures, such as paging. The enhancements to visitor location database 114 as described herein advantageously synchronize MM data between the CS domain and the PS domain to avoid such problems.

Example

Figure 5:
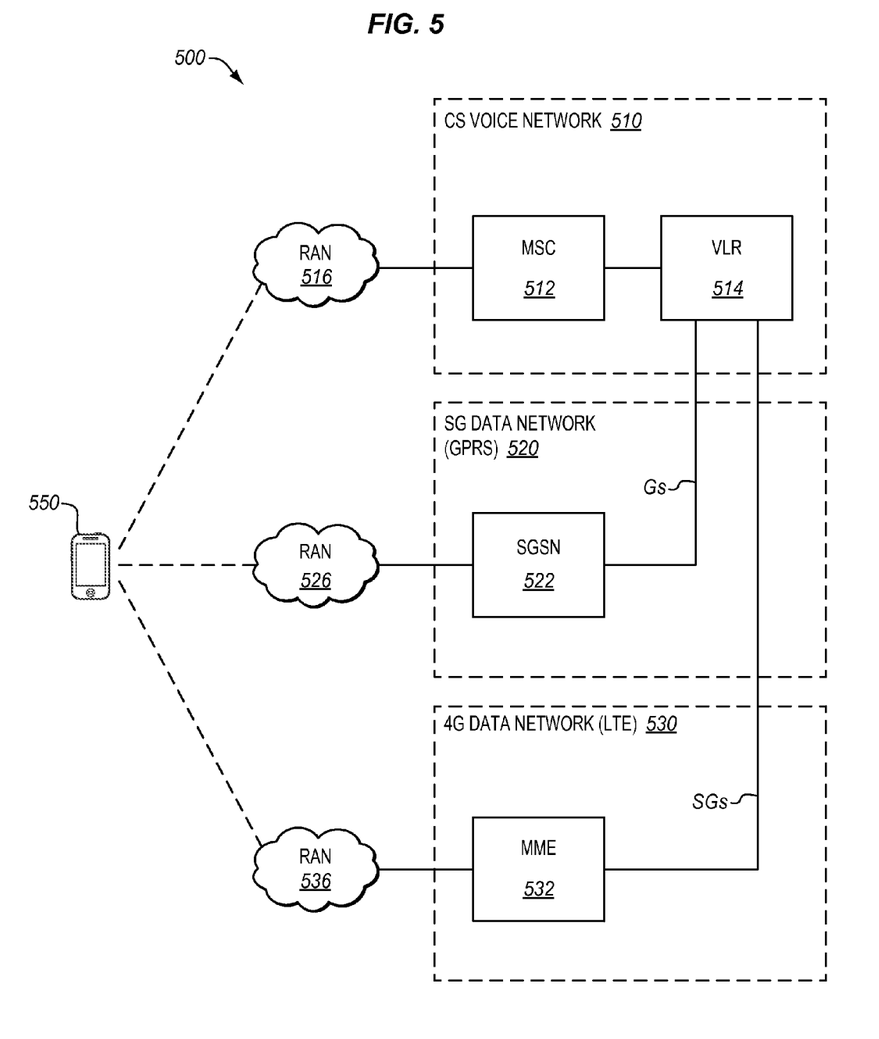
FIG. 5 illustrates another network architecture in an exemplary embodiment.

FIG. 5 illustrates a network architecture 500 in another exemplary embodiment. Network architecture 500 includes a CS voice network 510 that represents a CS domain. Voice network 510 may comprise a GSM, CDMA2000, or another type of voice network that includes an Mobile Switching Center (MSC) 512 and a Visitor Location Register (VLR) 514. Those skilled in the art understand that MSC 512 and VLR 514 may be integrated together. CS voice network 510 is able to provide voice services to User Equipment (UE) 550 over a Radio Access Network (RAN) 516.

Network architecture 500 also includes a 3G (or 2.5G) data network 520. 3G data network 520 in this example is a GPRS network that is able to provide data services to UE 550. The GPRS network includes an SGSN 522 that is responsible for exchanging packets with UE 550 over RAN 526. Another responsibility of SGSN 522 is mobility management for UE 550. SGSN 522 includes a location register (not shown) which stores information for UE 550, such as location information, the present VLR for UE 550, user profiles, etc. In order to perform mobility management, SGSN 522 communicates with VLR 514 over a Gs interface.

Network architecture 500 also includes a 4G data network 530. 4G data network 530 in this example is an LTE network that is able to provide data services to UE 550. The LTE network includes an MME 532 that is responsible for mobility management for UE 550. MME 532 also includes a location register (not shown) which stores information for UE 550, such as location information, the present VLR for UE 550, etc. In order to perform mobility management, MME 532 communicates with VLR 514 over an SGs interface.

Both 3G data network 520 and 4G data network 530 may include additional network nodes, but the relevant nodes are shown in FIG. 5.

In this example, VLR 514 is enhanced so that it synchronizes MM data for UE 550 between the CS domain and the PS domain. The PS domain in this example is represented by the GPRS network (i.e., 3G data network 520) and the LTE network (i.e., the 4G data network 530).

Figure 6:
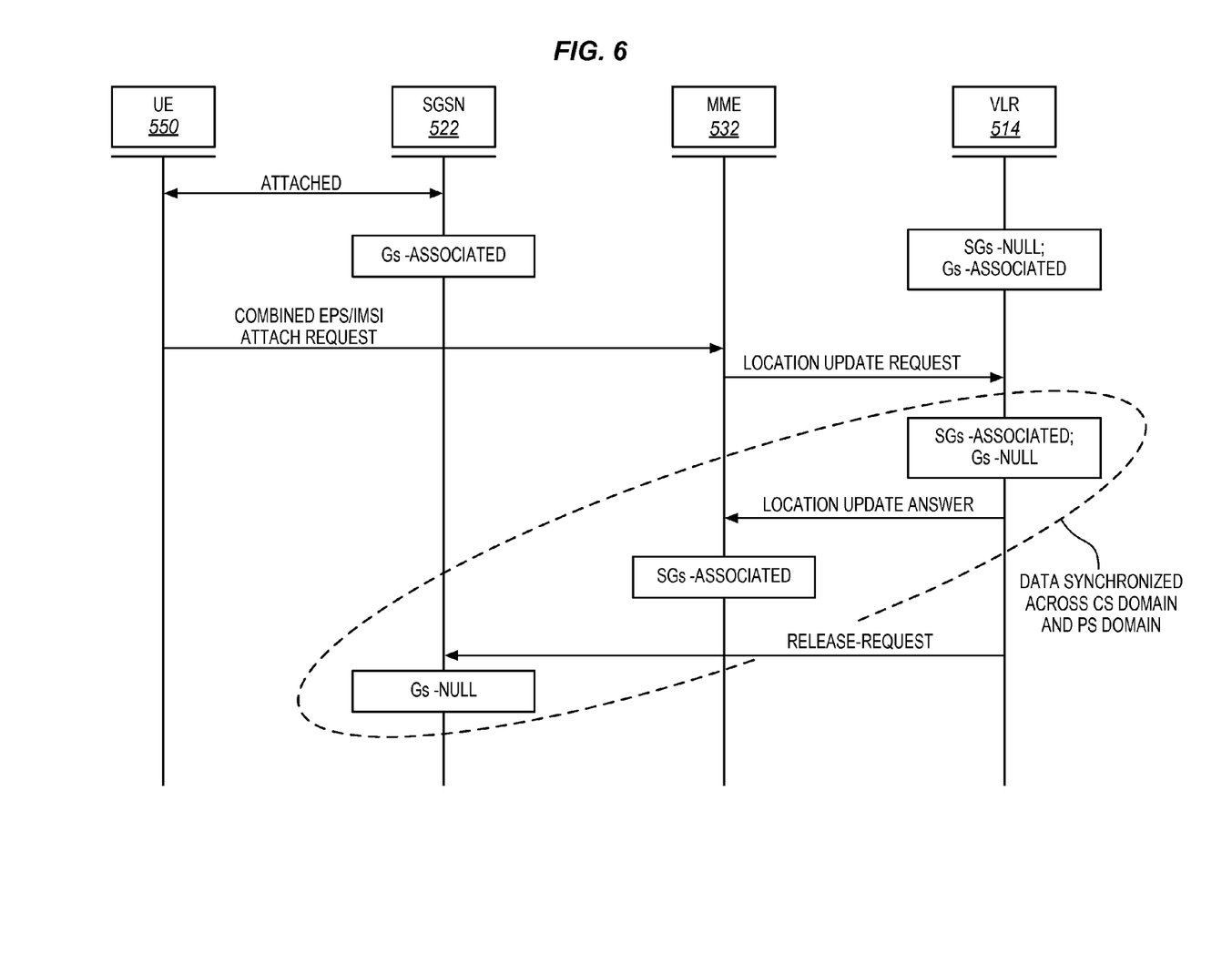
FIGS. 6-7 are message diagrams illustrating a VLR synchronizing MM data in an exemplary embodiment.

FIG. 6 is a message diagram illustrating VLR 514 synchronizing MM data in an exemplary embodiment. In this example, UE 550 is initially attached to the GPRS network through SGSN 522. Therefore, the location register for UE 550 as stored locally in SGSN 522 indicates an association with VLR 514. When SGSN 522 has an association with VLR 514 over the Gs interface, SGSN 522 stores a status of "Gs associated" in the location register for UE 550. Also, VLR 514 has an association with SGSN 522 for UE 550. Thus, VLR 514 stores a status of "Gs associated" in the location register for UE 550.

After attaching to the GPRS network, UE 550 moves to a service area served by the LTE network. When this occurs, UE 550 sends a combined EPS/IMSI attach request to MME 532 to attach to the LTE network. MME 532 then sends a LOCATION-UPDATE-REQUEST to VLR 514 over the SGs interface. When VLR 514 receives the LOCATION-UPDATE-REQUEST, VLR 514 updates the MM data for UE 550. Gs and SGs associations cannot be active simultaneously in VLR 514 for a UE. On the VLR side, activation of one association would trigger deactivation of the other association. Thus, VLR 514 adds an indicator of an SGs association with MME 532 in the MM context for UE 550 to activate the SGs association. The location register in VLR 514 will therefore indicate a status of "SGs associated" for UE 550.

If VLR 514 changes the association status the location register of UE 550, it will also determine if a prior association existed. In this case, a prior association existed with SGSN 522 as a Gs association. If the Gs association is not NULL, then VLR 514 will reset the status to "Gs-NULL". At this point, the MM context for UE 550 in VLR 514 will indicate an SGs association with MME 532, and no Gs association with SGSN 522.

Even though VLR 514 has removed the Gs association, SGSN 522 still indicates a Gs association is active with VLR 514 for UE 550. In order to synchronize the MM data with the PS domain, VLR 514 generates a release indicator that is intended for SGSN 522. The release indicator indicates to SGSN 522 that the Gs association on the VLR side has been removed because UE 550 has attached to another network. Therefore, SGSN 522 needs to deactivate or release the Gs association with VLR 514 for UE 550. VLR 514 inserts the release indicator in a message, such as a Gs-RELEASE-REQUEST, and sends the Gs-RELEASE-REQUEST to SGSN 522. When SGSN 522 receives the Gs-RELEASE- REQUEST (with the cause indicating "release Gs"), SGSN 522 removes the Gs association for UE 550 from its location register and sets the Gs association status to "Gs-NULL". At this point, the MM data is synchronized between the PS domain and the CS domain.

Figure 7:
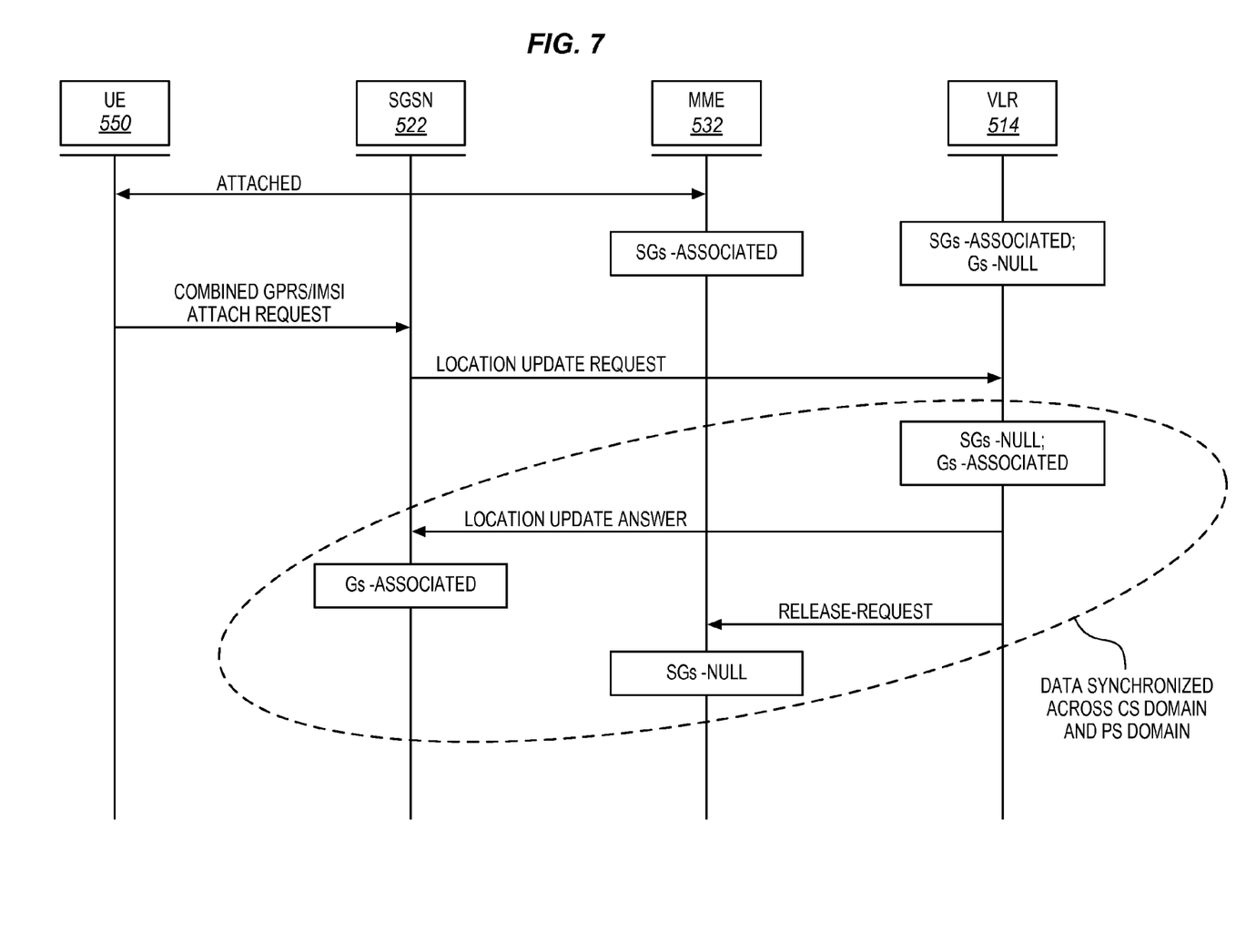

FIG. 7 is a message diagram illustrating another example of VLR 514 synchronizing MM data in an exemplary embodiment. In this example, UE 550 is attached to the LTE network. Therefore, the location register for UE 550 as stored locally in MME 532 indicates an association with VLR 514. When MME 532 has an association with VLR 514 over the SGs interface, MME 532 stores a status of "SGs associated" in the location register for UE 550. Also, VLR 514 indicates in its locally-stored MM context for UE 550 that there is an association with MME 532. Thus, VLR 514 stores a status of "SGs associated" in the location register for UE 550.

After attaching to the LTE network, UE 550 moves to a service area of the GPRS network. When this occurs, UE 550 sends a combined GPRS/IMSI attach request to SGSN 522 to attach to the GPRS network. SGSN 522 then sends a LOCATION-UPDATE-REQUEST to VLR 514 over the Gs interface. When VLR 514 receives the LOCATION-UPDATE-REQUEST, VLR 514 updates the MM data for UE 550. To do so, VLR 514 adds an indicator of a Gs association with SGSN 522 in the MM context for UE 550 to activate the Gs association. The location register in VLR 514 will therefore indicate a status of "Gs associated" for UE 550.

If VLR 514 changes the association status the location register of UE 550, it will also determine if a prior association existed. In this case, a prior association existed with MME 532 as an SGs association. If the SGs association is not NULL, then VLR 514 will reset the status to "SGs-NULL". At this point, the MM context for UE 550 in VLR 514 will indicate a Gs association with SGSN 522, and no SGs association with MME 532.

Even though VLR 514 has removed the SGs association, MME 532 still indicates an SGs association is active with VLR 514 for UE 550. In order to synchronize the MM data with the PS domain, VLR 514 generates a release indicator that is intended for MME 532. The release indicator indicates to MME 532 that the SGs association on the VLR side has been removed because UE 550 has attached to another network. Therefore, MME 532 needs to deactivate or release the SGs association with VLR 514 for UE 550. VLR 514 inserts the release indicator in a message, such as an SGs-RELEASE-REQUEST, and sends the SGs-RELEASE-REQUEST to MME 532. When MME 532 receives the SGs-RELEASE-REQUEST (with the cause indicating "release SGs"), MME 532 removes the SGs association for UE 550 and sets the SGs association status to "SGs-NULL". At this point, the MM data for UE 550 is synchronized between the PS domain and the CS domain.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. A system comprising:
a visitor location database of a Circuit-Switched (CS) domain that is able to provide voice communications to a mobile device;
the visitor location database is configured to communicate with a first Mobility Management (MM) node of a first Packet-Switched (PS) data network that connects to the mobile device in a PS domain;
the visitor location database is further configured to store MM data for the mobile device that indicates an association with the first MM node;
the visitor location database is further configured to, in response to determining the mobile device moves from the first PS data network to a second PS data network,
update the MM data for the mobile device to remove the association with the first MM node,
generate a release indicator which indicates that the association with the first MM node has been removed, and
transmit the release indicator to the first MM node so that the first MM node releases an association with the visitor location database from the MM data stored for the mobile device.

2. The system of claim 1 wherein:
the visitor location database is further configured to update the MM data for the mobile device to add an association with a second MM node of the second PS data network in response to determining the mobile device moves from the first PS data network to the second PS data network.

3. The system of claim 1 wherein:
the first MM node comprises a Serving GPRS Support Node (SGSN) of a General Packet Radio Service (GPRS) network, and the SGSN connects to the visitor location database over a Gs interface;
the visited location database is further configured to insert the release indicator in a new Information Element (IE) of a message defined for the Gs interface.

4. The system of claim 3 wherein:
the message defined for the Gs interface comprises a Gs-RELEASE-REQUEST.

5. The system of claim 1 wherein:
the first MM node comprises a Mobility Management Entity (MME) of a Long Term Evolution (LTE) network, and the MME connects to the visitor location database over an SGs interface;

the visited location database is further configured to insert the release indicator in a new Information Element (IE) of a message defined for the SGs interface.

6. The system of claim 5 wherein:
the message defined for the SGs interface comprises an SGs-RELEASE-REQUEST.

7. The system of claim 1 wherein:
the visitor location database comprises a Visitor Location Register (VLR) of the CS domain.

8. A method operable in a visitor location database of a Circuit-Switched (CS) domain that is able to provide voice communications to a mobile device, wherein the visitor location database is configured to communicate with a first Mobility Management (MM) node of a first Packet-Switched (PS) data network that connects to the mobile device in a PS domain, and to communicate with a second MM node of a second PS data network that connects to the mobile device in the PS domain, the method comprising:
storing MM data for the mobile device that indicates an association with the first MM node;
after determining the mobile device moves from the first PS data network to the second PS data network, then:
updating the MM data for the mobile device to remove the association with the first MM node;
generating a release indicator which indicates that the association with the first MM node has been removed; and
transmitting the release indicator to the first MM node for instructing the first MM node to release an association with the visitor location database from the MM data stored for the mobile device.

9. The method of claim 8 further comprising:
updating the MM data for the mobile device to add an association with a second MM node of the second PS data network in response to determining the mobile device moves from the first PS data network to the second PS data network.

10. The method of claim 8 wherein:
the first MM node comprises a Serving GPRS Support Node (SGSN) of a General Packet Radio Service (GPRS) network, and the SGSN connects to the visitor location database over a Gs interface; and
the method further comprises:
inserting the release indicator in a new Information Element (IE) of a message defined for the Gs interface.

11. The method of claim 10 wherein:
the message defined for the Gs interface comprises a Gs-RELEASE-REQUEST.

12. The method of claim 8 wherein:
the first MM node comprises a Mobility Management Entity (MME) of a Long Term Evolution (LTE) network, and the MME connects to the visitor location database over an SGs interface; and
the method further comprises:
inserting the release indicator in a new Information Element (IE) of a message defined for the SGs interface.

13. The method of claim 12 wherein:
the message defined for the SGs interface comprises an SGs-RELEASE-REQUEST.

14. The method of claim 8 wherein:
the visitor location database comprises a Visitor Location Register (VLR) of the CS domain.

15. A system comprising:
a Visitor Location Register (VLR) of a Circuit-Switched (CS) domain that is able to provide voice communications to a mobile device;
the VLR is configured to communicate with a Serving GPRS Support Node (SGSN) of a General Packet Radio Service (GPRS) network over a Gs interface, and to communicate with a Mobility Management Entity (MME) of a Long Term Evolution (LTE) network over an SGs interface;
the VLR is further configured to, in response to determining the mobile device attaches to the GPRS network after initially attaching to the LTE network, update MM data for the mobile device to activate a Gs association with the SGSN, and update the MM data for the mobile device to deactivate an SGs association with the MME;
the VLR is further configured to generate a release indicator which indicates that the SGs association is deactivated in the VLR, and to transmit the release indicator to the MME over the SGs interface.

16. The system of claim 15 wherein:
the VLR is further configured to insert the release indicator in a new Information Element (IE) of a message defined for the SGs interface.

17. The system of claim 16 wherein:
the message defined for the SGs interface comprises an SGs-RELEASE-REQUEST.

18. The system of claim 15 wherein:
the VLR is further configured to, in response determining the mobile device attached to the LTE network after initially attaching to the GPRS network, update MM data for the mobile device to activate an SGs association with the MME, and update the MM data for the mobile device to deactivate a Gs association with the SGSN;
the VLR is further configured to generate a release indicator which indicates that the Gs association is deactivated in the VLR, and to transmit the release indicator to the SGSN over the Gs interface.

19. The system of claim 18 wherein:
the VLR is further configured to insert the release indicator in a new Information Element (IE) of a message defined for the Gs interface.

20. The system of claim 19 wherein:
the message defined for the Gs interface comprises a Gs-RELEASE-REQUEST.

* * * * *